United States Patent [19]

Hartland

[11] Patent Number: 5,047,595
[45] Date of Patent: Sep. 10, 1991

[54] CONDUCTOR RAILS
[75] Inventor: David J. Hartland, Taunton, England
[73] Assignee: Willis Brecknell & Co., Limited, Chard, England
[21] Appl. No.: 527,048
[22] Filed: May 17, 1990
[30] Foreign Application Priority Data
May 20, 1989 [GB] United Kingdom ............... 8911676
[51] Int. Cl.⁵ ............................................. E01B 5/08
[52] U.S. Cl. .............................. 191/22 DM; 238/143; 228/173.1
[58] Field of Search ............... 238/143, 144, 145, 146, 238/147; 191/22 DM, 29 DM; 228/173.1, 173.2

[56] References Cited
U.S. PATENT DOCUMENTS

| 2,820,084 | 1/1958 | Shaw | 191/22 DM X |
| 3,830,989 | 8/1974 | Laurent | 191/22 DM X |
| 3,885,655 | 5/1975 | Corl et al. | 238/143 X |

FOREIGN PATENT DOCUMENTS

| 2435641 | 2/1975 | Fed. Rep. of Germany | 191/22 DM |
| 2286680 | 7/1977 | France. | |
| 100 | of 1884 | United Kingdom | 238/143 |
| 641 | of 1907 | United Kingdom | 238/143 |
| 1280714 | 7/1972 | United Kingdom. | |
| 1395178 | 5/1975 | United Kingdom. | |
| 1415904 | 12/1975 | United Kingdom. | |

Primary Examiner—David A. Bucci
Assistant Examiner—Craig Slavin
Attorney, Agent, or Firm—Ware, Fressola et al.

[57] ABSTRACT

A conductor rail comprises a main body of aluminium and a stainless steel facing layer which is produced by welding together two longitudinal J-section strips. The welding operation is effected with the strips in contact with the main body and provides an extremely effective interlocking engagement of the facing layer and main body.

13 Claims, 2 Drawing Sheets

CONDUCTOR RAILS

FIELD OF THE INVENTION

This invention relates to conductor rails such as are used in electric railway systems and in other transportation systems such as overhead conveyors.

BACKGROUND OF THE INVENTION

One method of manufacturing conductor rails is described in French Patent Specification No. 2286680 which involves bending a facing strip of a wear-resisting material into contact with a main body formed of aluminium and then effecting a crimping operation to key the facing strip into interlocking engagement with the main body.

A disadvantage of this production method is that the maximum thickness of facing strip that can be employed is 3mm. This quite clearly imposes a limitation on the wear-resisting characteristics of the facing strip.

Another method which is employed for the production of conductor strips involves the co-extrusion of a main body of aluminium and a steel facing layer so that a chemical bonding of the facing layer to the aluminium body is obtained. This method enables the production of a facing layer of, for example, 5mm. in thickness but the production facilities which are involved are extremely expensive.

It is accordingly an object of the present invention to provide an improved method for the manufacture of conductor rails.

SUMMARY OF THE INVENTION

According to one aspect of the present invention there is provided a method of manufacturing a conductor rail comprising a main body and a wear-resisting facing layer, said method including forming the facing layer as two or more portions which are welded together in contact with the main body in such manner as to obtain a mechanical interlocking engagement of the facing layer with the main body.

In a preferred form of the invention, the facing layer is formed as two longitudinal strips which are placed in position on the main body and are welded together in such manner as to provide a longitudinally extending, centrally disposed weld seam.

The two longitudinal strips from which the facing layer is formed are preferably mirror images of one another so that the formed conductor rail has a central longitudinal axis of symmetry, each strip including an upper limb which, prior to the welding operation is positioned resting on the upwardly presented surface of the main body.

Said upwardly presented surface of the main body is preferably formed with a longitudinal, centrally disposed shallow rebate and the dimensions of the main body and of the two longitudinal strips are preferably such that, when the two longitudinal strips are placed in position on the main body, there is a small gap between the contiguous edges of the upper limbs of the two longitudinal strips, which gap overlies the centrally disposed rebate in the upwardly presented surface of the main body.

Said contiguous edges may lie in the same plane as the remainder of the upper limb of the associated strip. If desired, however, the contiguous edge portions may be down-turned to define a triangular cross-section channel for the reception of a correspondingly sectioned fillet of weld material.

After the welding operation, a machining operation is preferably carried out to ensure that the conductor rail has a smooth, upwardly presented surface for engagement with the associated conductor shoe, the machining operation being carried out either over the full width of the upwardly presented surface of the rail or, particularly if the contiguous edges of the longitudinal strips are down-turned, confined to the central portion of the rail.

In addition to having an upper limb as referred to above, each longitudinal strip may include a lower limb which extends inwardly in the assembled construction and is shorter than the associated upper limb. Each longitudinal strip may thus be considered as being of generally J-form in cross-section.

The cross-sections of the longitudinal strips and of the main body may be such that, prior to welding being effected, the longitudinal strips are close fits on the main body. The welding operation is then preferably so carried out that, as the longitudinal strips cool after completion of the weld, the facing layer afforded by the welded-together strips contracts and a tension loading is set up within the facing layer which is thus caused, in effect, to exert a gripping action on the main body.

As an alternative to the longitudinal strips being close fits on the main body, the cross-sections of the strips and the main body may be such that, prior to welding, there is significant clearance between the strips and the main body; the arrangement is, however, such that this clearance is removed by the welding operation and the formed facing layer is in close interlocking contact with the main body.

The main body is preferably formed of aluminium or an appropriate aluminium alloy and, prior to the welding operation, it is accordingly necessary to remove the surface layer of aluminium oxide from the surfaces of the main body which will, in the completed conductor rail, be in physical contact with the facing layer. Such removal of the aluminium oxide layer is preferably effected utilising an abrading apparatus which includes wire brushes or equivalents for effecting removal of the oxide layer and also includes grease-applying means for applying a protective coating to the abraded surfaces.

The grease is preferably applied to radiused surfaces along both sides of the main body and may be an electrically conductive grease, for example, a zinc-loaded grease to reduce the resistance afforded by the interface between the main body and the facing layer.

As an alternative to the use of two longitudinal J-section strips, the facing layer may be afforded by three strips appropriately welded together longitudinally of the main body to afford a facing layer mechanically interlocked or keyed into engagement with the main body. The three strips which are welded together may comprise a pair of edge strips of somewhat C shape in cross-section and a planar central connecting strip welded along its two opposed edges to the C-section side strips.

The facing layer is formed of a material having wear characteristics significantly better than the material of which the main body is formed, the preferred material being stainless steel. For certain applications, however, the facing layer may be formed of mild steel or of copper.

Where the facing layer is formed from two longitudinal J-section strips, the required cross-sectional configuration may be obtained by appropriate bending of planar strip, or by extrusion.

According to a second aspect of the present invention there is provided a conductor rail comprising a main body and a wear-resisting facing layer formed from two or more strips welded together in contact with the main body and mechanically interlocked with the main body in electrically conducting relation therewith.

DESCRIPTION OF THE PREFERRED EMBODIMENT

Figure 1:
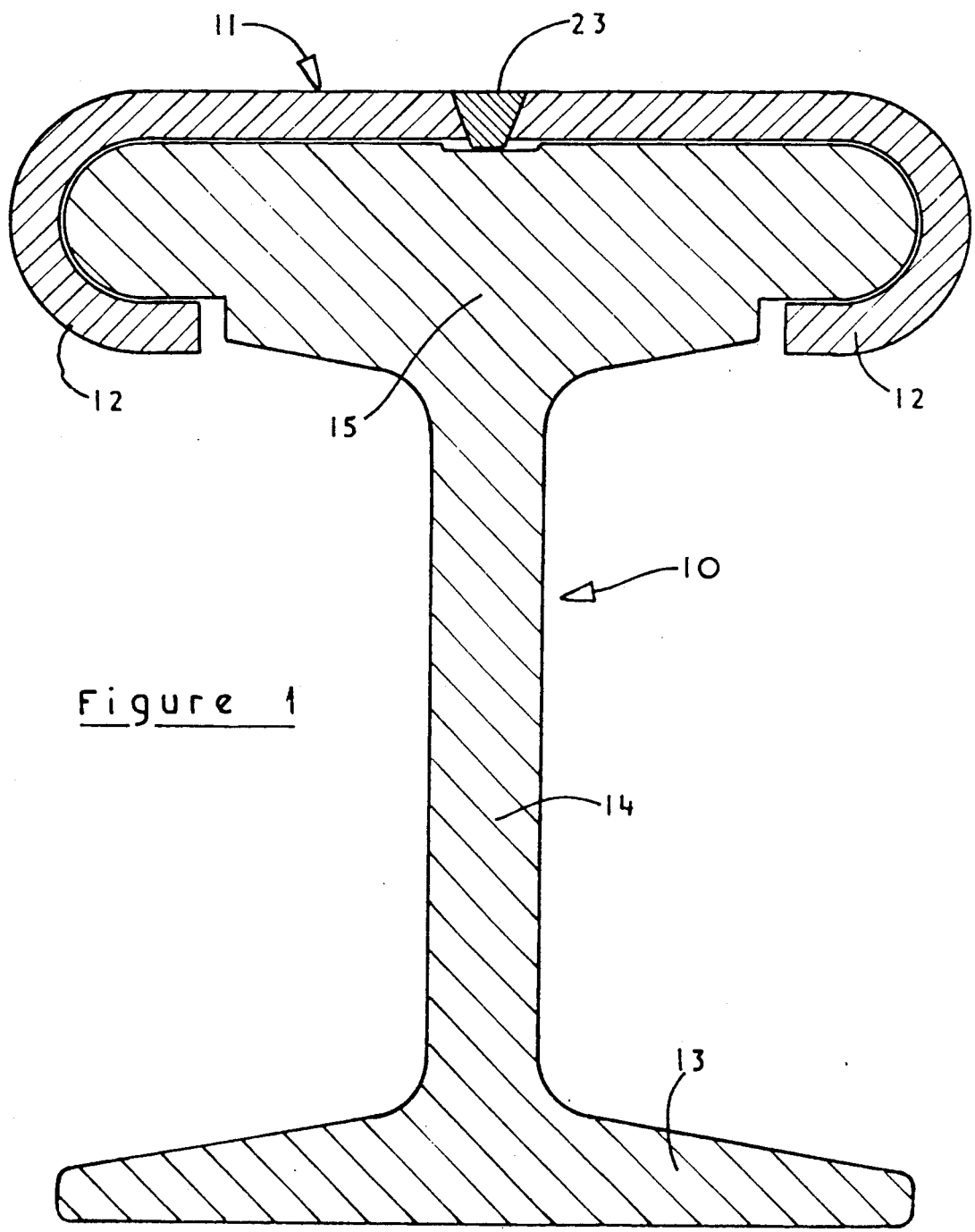
FIG. 1 is a vertical sectional view of a conductor rail.
Figure 2:
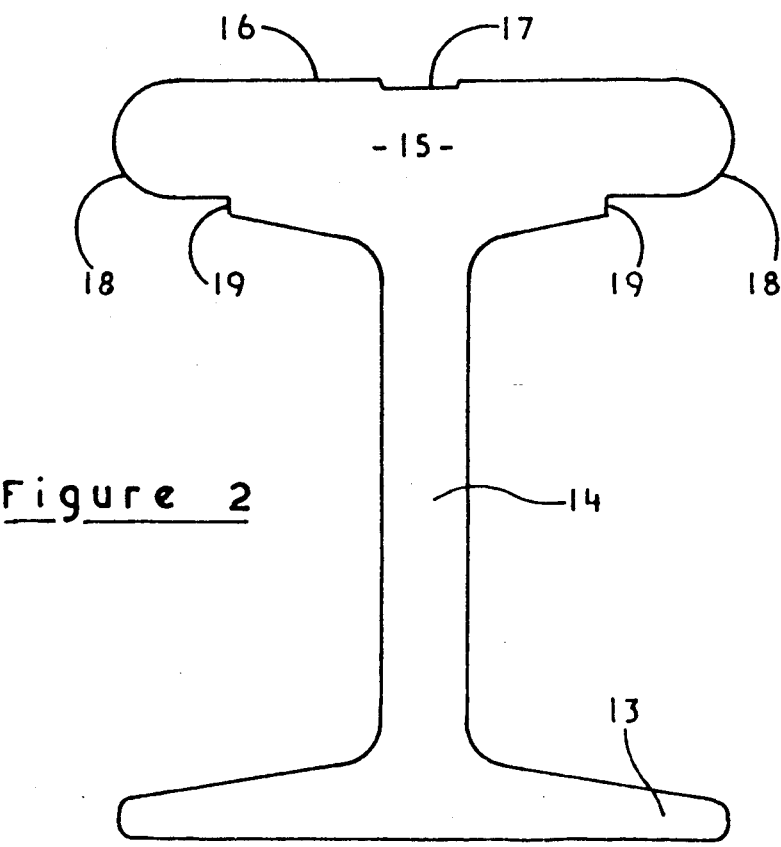
FIG. 2 is a vertical sectional view of an aluminium body forming part of the conductor rail.

As shown in the drawings, a conductor rail for an electric railway system comprises an aluminium body 10 to which is attached a facing layer 11 formed from two stainless steel strips 12. As shown in FIG. 1, the aluminium body 10 comprises an enlarged base portion 13, a parallel-sided vertical stem portion 14 and an enlarged head portion 15 having a width corresponding to that of the base portion 13. The head portion 15 has a generally planar upwardly presented surface 16 which is formed with a longitudinally extending central rebate 17. For a rail of width 80 mm. the rebate 17 may have a width of 10 mm. and a depth of 0.5 mm. It is to be appreciated that these dimensions are purely indicative and that, for conductor rails of different sizes and for different uses, the dimensions of the central rebate 17 will be varied accordingly.

The longitudinally extending side edge portions of the enlarged head portion 15 are formed with radiused surfaces 18 so that, in effect, each of said side edge portions is of part-cylindrical form. The under-surfaces of the head portion are cut away or recessed as shown to define outwardly facing shoulders 19. The aluminium body 10 may have a height of 100 mm. and will be of indefinite, but substantial, length. The aluminium body 10 may be formed either as a casting or as an extrusion.

The two stainless steel strips 12, which together define the facing layer 11, are each of generally J-form in cross section, comprising an upper or longer limb 20 and a lower or shorter limb 21, with the two limbs 20 and 21 interconnected by an arcuate connecting portion 22. When the two stainless steel strips 12 are placed in position on the aluminium body 10 so that the arcuate connecting portions fit closely over the radiused surfaces 18, the inwardly facing ends of the upper limbs 20 of the two strips 12 will be almost in contact. There will also be a small clearance between the two facing ends and the adjacent surface of the aluminium body.

Figure 3:
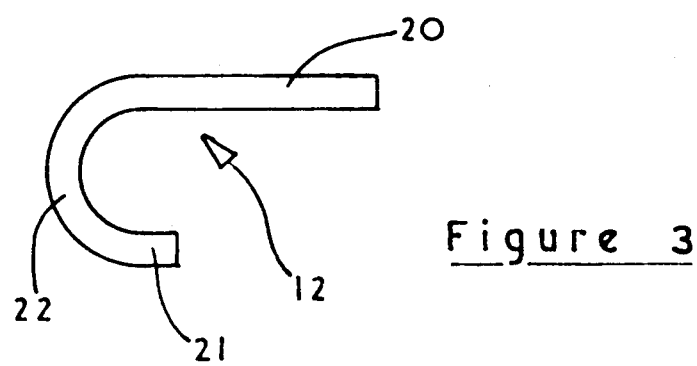
FIG. 3 is a vertical sectional view of one of the two stainless steel strips which are attached to the aluminium body of FIG. 2 to form the conductor rail of FIG. 1.

When the two longitudinal strips 12 have been placed in position on the aluminium body 10, being snapped in position if desired, the oppositely facing ends of the upper limbs 20 of the two strips 12 are welded together to form a longitudinal seam weld 23 as shown in FIG. 3. The welding parameters are so controlled as to ensure that, as the welded materials cool after the welding operation has been completed, the facing layer 11 formed from the two strips 12 will tend to contract. This tendency of the facing layer 11 to contract will induce a stress within the steel forming the facing layer and will, in effect, pull the two J-sections inwardly into positive gripping engagement with the rail head portion 15.

After the welding operation has been completed, the upwardly presented surface of the formed composite rail is subjected to a machining operation to remove any excess weld material and to ensure that said upwardly presented surface has the required smooth finish. The machining operation may be carried out either over the full width of the upper surface of the rail or may be limited to the vicinity of the weld.

The facing layer 11 is mechanically interlocked with the aluminium body 10 and maintains its effectiveness even when the facing layer 11, which serves as a wear strip, has been worn down to only a fraction of its original thickness. The thickness of the facing layer 11, typically 5 mm., ensures that the conductor rail has an effective life which is significantly greater than rails at present in use having a wear strip 3 mm. in thickness.

Each of the two steel strips 12 may be bent into the required J configuration. As an alternative, however, the strip configuration may be such that, because of the inherent resilience of the strip material, it is necessary to force each strip into position and to clamp it in place prior to welding. The welding operation which joins the two strips together then serves to ensure that the formed facing layer is urged into and maintained in gripping contact with the edge portions of the aluminium body.

In order to ensure an effective electrical connection between the aluminium body 10 and the two strips 12, those surfaces of the head portion 15 which will be engaged by the strips 12 are subjected to a pre-treatment to ensure removal of the surface layer of aluminium oxide. This pre-treatment can involve abrasion by wire brushes followed by greasing using, for example, a zinc-loaded grease. The abrasion and greasing operations can be carried out in sequence using a single piece of equipment which is moved along the length of the body 10 to prepare it for attachment of the facing layer 11.

I claim:

1. A method of manufacturing a conductor rail comprising a main body and a wear-resisting facing layer, said main body having an upwardly presented surface, said method including forming the facing layer as at least two portions and welding said at least two portions together when disposed in contact with the main body in such manner as to obtain a mechanical interlocking engagement of the thus formed facing layer with the main body.

2. A method according to claim 1, in which the facing layer is formed as two longitudinal strips which are placed in position on the main body and are welded together in such manner as to provide a longitudinally extending, centrally disposed weld seam.

3. A method according to claim 2, in which the two longitudinal strips from which the facing layer is formed are mirror images of one another so that the formed conductor rail has a central longitudinal axis of symmetry, each strip including an upper limb which, prior to the welding operation, is positioned so as to rest on the upwardly presented surface of the main body.

4. A method according to claim 3, in which said upwardly presented surface of the main body is formed with a longitudinal, centrally disposed, shallow rebate and the dimensions of the main body and of the two longitudinal strips are such that, when the two longitudinal strips are placed in position on the main body, there is a small gap between the contiguous edges of the upper limbs of the two longitudinal strips, which gap overlies the centrally disposed rebate in the upwardly presented surface of the main body.

5. A method according to claim 4, in which said contiguous edges lie in the same plane as the remainder of the upper limb of the associated strip.

6. A method according to claim 1, in which, after the welding operation, a machining operation is carried out to ensure that the conductor rail has a smooth, upwardly presented surface for engagement with the associated conductor shoe.

7. A method according to claim 6, in which the machining operation is carried out over the full width of the upwardly presented surface of the rail.

8. A method according to claim 4, in which, in addition to having an upper limb, each longitudinal strip includes a lower limb which extends inwardly in the assembled construction and is shorter than the associated upper limb.

9. A method according to claim 2, in which the cross-sections of the longitudinal strips and of the main body are such that, prior to welding being effected, the longitudinal strips are close fits on the main body, the welding operation being so carried out that, as the longitudinal strips cool after completion of the weld, the facing layer afforded by the welded-together strips contracts and a tension loading is set up within the facing layer which is thus caused, in effect, to exert a gripping action on the main body.

10. A method according to claim 1 in which the main body is formed from the group consisting of aluminium and aluminium alloys and in which a surface layer of aluminium oxide is removed from the surfaces of the main body which will, in the completed conductor rail, be in physical contact with the facing layer, such removal of the aluminium oxide layer being effected utilising an abrading apparatus which not only includes wire brushes or equivalents for effecting removal of the oxide layer but also includes grease-applying means for applying a protective coating to the abraded surfaces.

11. A method according to claim 1, in which the facing layer is formed from two longitudinal J-section strips, the required cross-sectional configuration being obtained by bending of a planar strip, or by extrusion.

12. A conductor rail comprising a main body and a wear-resisting facing layer formed from at least two strips welded together in contact with the main body and mechanically interlocked with the main body in electrically conducting relation therewith.

13. A conductor rail according to claim 12, in which the main body is formed from the group consisting of aluminium and aluminium alloys, the facing layer is formed from the group consisting stainless steel, mild steel and copper, and the facing layer is made from two longitudinal J-section strips.

* * * * *

UNITED STATES PATENT AND TRADEMARK OFFICE
CERTIFICATE OF CORRECTION

PATENT NO. : 5,047,595
DATED : Sept. 10, 1991
INVENTOR(S) : David Julian Hartland It is certified that error appears in the above-identified patent and that said Letters Patent is hereby corrected as shown below:

TITLE PAGE: Item "[73]":

Please correct the name of the Assignee to read:

Brecknell, Willis & Co. Limited

Signed and Sealed this

Fourteenth Day of January, 1992

Attest:

HARRY F. MANBECK, JR.

Attesting Officer

Commissioner of Patents and Trademarks